United States Patent
Voss et al.

[11] 3,845,277
[45] Oct. 29, 1974

[54] OFF-LINE CASH DISPENSER AND BANKING SYSTEM

[75] Inventors: Robert H. Voss, Goshen; Earl M. Ward, Hamilton; William L. Spetz, Cincinnati, all of Ohio

[73] Assignee: The Mosler Safe Company, Hamilton, Ohio

[22] Filed: Sept. 1, 1972

[21] Appl. No.: 285,812

[52] U.S. Cl. ........................ 235/61.7 B, 340/149 A
[51] Int. Cl. ............................................. G06k 5/00
[58] Field of Search ................ 235/61.7 B, 61.7 R; 340/149 A, 149

[56] References Cited
UNITED STATES PATENTS

| | | | |
|---|---|---|---|
| 3,039,582 | 6/1962 | Simjian | 235/61.7 B |
| 3,308,439 | 3/1967 | Tink et al. | 235/61.7 B |
| 3,564,210 | 2/1971 | Presti | 235/61.7 B |
| 3,610,889 | 10/1971 | Goldman | 340/149 A |
| 3,648,020 | 3/1972 | Tateisi et al. | 235/61.7 B |
| 3,657,521 | 4/1972 | Constable | 235/61.7 B |
| 3,662,343 | 5/1972 | Goldstein et al. | 235/61.7 B |
| 3,697,729 | 10/1972 | Edwards et al. | 235/61.7 B |
| 3,705,384 | 12/1972 | Wahlberg | 235/61.7 B |
| 3,719,927 | 3/1973 | Michels et al. | 235/61.7 B |

*Primary Examiner*—Daryl W. Cook
*Attorney, Agent, or Firm*—Wood, Herron & Evans

[57] ABSTRACT

A method and apparatus for automatically dispensing cash and performing other transactions relating to customer accounts. A magnetic card reader reads coded information into the system from a credit card which information identifies the account of the user. A keyboard entered code is compared with the card encoded information to verify that the account is that of an authorized user. The system includes a disc storage file which is checked for the account numbers of stolen cards and of accounts with respect to which transactions are to be restricted or otherwise modified. The file also includes a list of the images of cards read in the most recent past transactions and against these images the inserted card is checked for detection of duplicate cards. The system is capable of performing different types of transactions involving plural accounts of each user. A control code on each card enables the selection of only those machine functions which the user is authorized to select. Each card includes a renewable credit limit which is restorable after a given usage interval. The cards are encoded with the maximum amount of cash dispensible per given usage interval, the length of the usage interval, the next usage date, and the amount remaining during the current usage interval.

40 Claims, 16 Drawing Figures

LINE OF CREDIT INFORMATION ON CARD
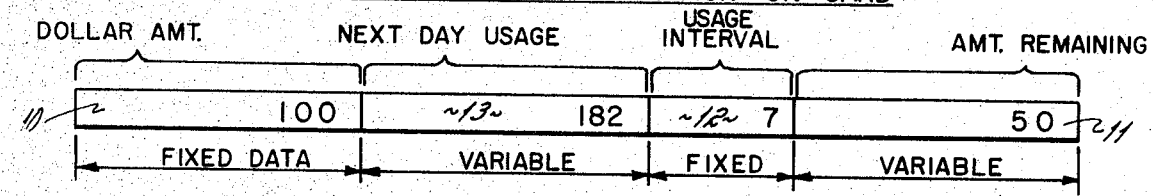
RENEWABLE CREDIT CARD LIMIT OF $100 EVERY 7 DAYS
*Fig. 1*
CARD FORMAT
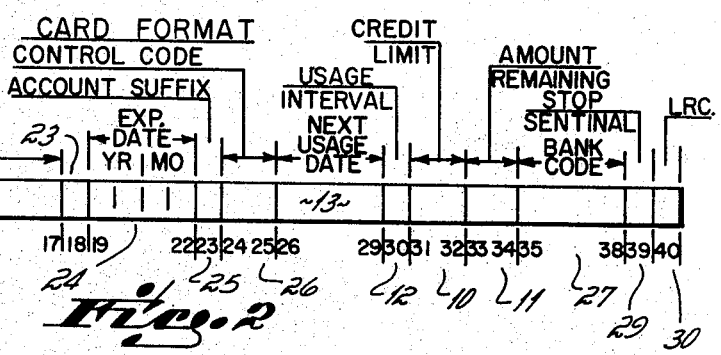
*Fig. 2*
MACHINE CONTROL FROM CODE ON CARD
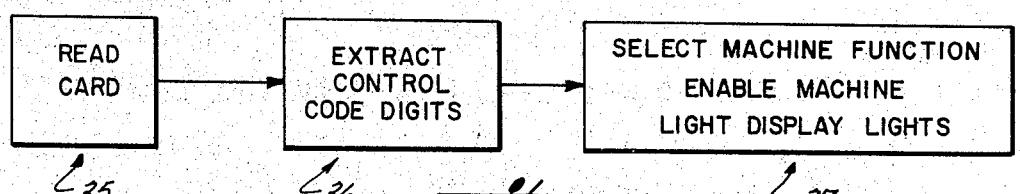
*Fig. 3*
CONTROL CODE FUNCTIONS
| | |
|---|---|
| CREDIT CARD | 10 |
| CHECKING ACCT | 20 |
| SAVINGS ACCT | 40 |
| LOAN | 1 |
| MORTGAGE | 2 |
| SPARE | 4 |
*Fig. 4*

Fig. 5

| Control Codes | Loan Payment | Mortgage Payment | Deposit | Cash from Credit Card | Cash from Checking | Cash from Savings | Checking to Savings | Savings to Checking | Checking to Loan | Savings to Loan | Checking to Mortgage | Savings to Mortgage |
|---|---|---|---|---|---|---|---|---|---|---|---|---|
| 01 | X | | | | | | | | | | | |
| 02 | | X | | | | | | | | | | |
| 03 | X | X | | | | | | | | | | |
| 10 | | | X | X | | | | | | | | |
| 11 | X | | X | X | | | | | | | | |
| 12 | | X | X | X | | | | | | | | |
| 13 | X | X | X | X | | | | | | | | |
| 20 | | | X | | X | | | | | | | |
| 21 | X | | X | | X | | X | | | | | |
| 22 | | X | X | | X | | | X | | | | |
| 23 | X | X | X | | X | | X | X | | | | |
| 30 | | | X | X | X | | | | | | | |
| 31 | X | | X | X | X | | X | | | | | |
| 32 | | X | X | X | X | | | X | | | | |
| 33 | X | X | X | X | X | | X | X | | | | |
| 40 | | | X | | | X | | | | | | |
| 41 | X | | X | | | X | | | X | | | |
| 42 | | X | X | | | X | | | | | | X |
| 43 | X | X | X | | | X | | | | | X | X |
| 50 | | | X | X | | X | | | | | | |
| 51 | X | | X | X | | X | | | X | | | |
| 52 | | X | X | X | | X | | | | | | X |
| 53 | X | X | X | X | | X | | | | | X | X |
| 60 | | | X | | X | X | X | X | | | | |
| 61 | X | | X | | X | X | X | X | X | | | |
| 62 | | X | X | | X | X | X | X | | X | | X |
| 63 | X | X | X | | X | X | X | X | X | X | X | X |
| 70 | | | X | X | X | X | X | X | | | | |
| 71 | X | | X | X | X | X | X | X | X | | X | |
| 72 | | X | X | X | X | X | X | X | | X | | X |
| 73 | X | X | X | X | X | X | X | X | X | X | X | X |

OFF-LINE CASH DISPENSER AND BANKING SYSTEM

The present invention relates to automatic banking systems and particularly to such systems as off-line cash dispensers which permit transactions in accordance with information encoded on cards carried by bank customers who use the system.

Modern banking systems have sought to provide automated teller facilities which are capable of carrying on the most routine banking functions such as check cashing, deposits, and withdrawals. For the convenience of customers, these systems have attempted to provide a plurality of automated remote units which are conveniently accessible to customers for such purposes. The major problem encountered in the development of such units is that of providing these units with current account information against which the authorization to perform transactions must be checked. One solution to this problem is to provide that these units be connected through data lines to the bank's central data processing center where each proposed transaction is automatically checked against the bank's data file. The expense and difficulty in providing such on-line systems is a serious drawback to their effective use and deployment.

The tendency has therefore been toward the use of off-line systems. However, to date the employment of such systems has all been at the expense of either credit security or convenience to the customers through the lack of provision for current updated account information at these remote off-line units. Many of these proposed units require the use of customer identifying cards which are deposited in card readers at these remote units, which cards carry a certain amount of account information. Some of these systems have provided for the updating of information on the cards which information is supposed to reflect in some way the current status of the user's accounts. However, the encoding schemes employed have been somewhat less than completely effective in maintaining sufficiently updated information at the remote off-line units and either do not give the customer the complete benefit of his full credit limit or leave the bank with much less than optimum security against the overdrawing of accounts and credit limits that it would have had the transactions been conducted in person by the customer at the bank's central office.

Accordingly, it is a primary objective of the present invention to provide an automatic banking system particularly useful with off-line cash dispenser units which can rely on the currency of information encoded on the customer's personal credit cards to allow the customer full use of his maximum current credit limit. More particularly, it is an objective of the present invention to provide such a banking system which gives the user with a personal card bearing thereon a renewable credit limit which reflects the results of all of the customer's transactions up to the current transaction.

Accordingly, one aspect of the present invention is predicated on the concept of assigning to each customer a maximum credit limit against which he may withdraw cash during some specific usage interval. This maximum amount, the usage interval, and the amount remaining during the interval, and the the usage date are encoded upon the user's card. As the customer withdraws money against his account, the withdrawn amount is subtracted from the remaining amount and the new remaining amount is stored in that field on the user's card. When this remaining amount is decreased to zero, the usage interval is added to the usage date and the next usage date is encoded upon the card to replace the usage date. No further transactions will be permitted against the user's account before the next usage date. If the next usage date read is more than the usage interval old, the usage date is first reset to the calendar date and the amount remaining is reset to the maximum amount.

A further consideration of such automated banking systems is that of providing such units with the capability of allowing different types of transactions for different users. For example, some users may be operating solely with the use of credit cards, while others may use also or instead checking or savings accounts. Such systems should further provide the capability of allowing the user to select the type of transaction which he desires.

The general problem involved with providing such a capability is that different customers will have different types of accounts, and the types of transactions to be permitted will differ from customer to customer.

Accordingly, it is a further objective of the present invention to provide such a system which will allow the selectability of transactions but only in accordance with the types of transactions authorized for each specific user.

Accordingly, the present invention provides an off-line system which is capable of accepting or performing any one of a number of different types of transactions. The system is further provided with means which condition the selection of various types of transactions upon specific authorization codes which are read from the individual user's personal cards. Specifically, each card associated with the system is provided with a control function code which represents the various types of transactions or accounts which the specific user is authorized to use. When this information is read into the system, all transactions involving transfers of funds to, from, or between authorized accounts will be enabled so that the user may select any one of, but only among, those authorized transactions.

Another important consideration for automatic banking systems of this type is to provide a certain amount of security against common fraudulent transactions. Such fraudulant transactions would include, for example, the use of stolen credit cards, the use of credit cards by persons whose credit has been revoked, and the use of counterfeit or duplicate credit cards. Another common and closely related problem which is particularly found in off-line systems of the type in which the information upon the user's card is used is that of revising the credit limits and other fixed data information upon the credit cards automatically without having the customer exchange his card with the bank.

Further objectives of the present invention are to overcome these problems in ways which maintain maximum security for the bank while still not requiring the use of coupling such systems on-line to a central processing unit.

The present invention provides new and particularly advantageous solutions to the above problems in one way or another through the use of the following features:

One feature of the present invention which accomplishes one of these objectives is the provision in the remote units of a memory file which may be in the form of a rotating disc or drum. Such memory may have recorded thereon the account numbers of certain cards or users whose authorization has for some reason been cancelled or modified. Specifically, these numbers may be those of stolen credit cards, users who have abused their credit and whose credit has therefore been terminated, of users whose credit limits have been reduced or even increased since their present cards were issued, or other such factors which would influence the authorization of transactions which can be executed against the accounts of such users. The system operates to check the number of each credit card presented to the remote unit against each number recorded in the memory file before any transaction is permitted to be executed against the user's account. If the account number is found, an interrogation of a certain code field of the memory file is made to determine the reason for the number appearing in the file. For example, a number may appear in the control code field of the memory file. If the account number represents that of a stolen card or one which is to be voided, a number, such as a zero, in this field will indicate such fact and a command is thereupon executed in the unit which will cause the card to be captured and permit no transaction to be made against the account. Another code in this field might indicate that the credit card is new and that credit has not yet been established, in which case transactions may be refused but the credit card will be returned to the customer. Furthermore, a code may appear which will indicate that the customer has opened a new account or closed an old account or that his credit limit has been either increased or decreased and the system will thereafter be conditioned to rewrite the customer's card to reflect this change of status.

Another feature which the present invention provides is one which is designed to detect the fraudulent practice of a user duplicating his credit cards to exceed his credit limit during a given usage interval. To detect such duplicate cards, the system is provided with means for recording in the memory file an image of each card which is read and against which a cash withdrawal is made. These images for a specified number of the most recent transactions are retained in the memory file. Whenever a card is inserted into the machine, this file is interrogated for an exact duplicate image. In that each cash transaction will result in a rewriting or updating of the card, any close correspondence between an inserted card and an image in the file will indicate that the card is a duplicate card. When this occurs, this card will be captured and no transaction will be permitted against the account indicated thereon.

Another security feature of the present invention is that of providing a manual code entry which must be made by the user prior to the operation of any of the machine functions. This code entry is made on a keyboard and the code thereby entered is automatically compared with a code carried by the card for correspondence. This code may be an indirect code derived from information on the card and transformed in a manner unknown to the user. This aspect of the system is more completely described in a copending application, Ser. No. 276,028, filed July 28, 1972, and invented by William L. Spetz. This application is hereby expressly incorporated into this application by reference.

The above features of the present invention provide the important advantages of making an entirely off-line system possible which can rely upon current and updated information coded upon the credit cards of the user to determine the types of transactions which the user is permitted to perform, the limits of the transactions which he can perform in given periods of time, and which can provide the bank with security against overdrafts and abuses of credit and against many of the most common types of fraudulent types of transactions which are encountered with such systems.

These features, however, are not limited to use in off-line systems. They provide important advantages in on-line systems also. They can be used in on-line systems to minimize tie up of the data lines and the amount of data that must be transmitted on the lines. Even in essentially real-time on-line systems, data can be conveyed to buffers and storage units for interrogation and analysis and thus enhance the time sharing ability of the control processing unit.

These and other objectives and advantages of the present invention will be more readily apparent from the following detailed description of the drawings which illustrate the preferred forms of the method and apparatus of the present invention in an off-line cash dispenser system which embodies the principles of the present invention:

FIG. 1 is a diagram illustrating the line of credit information which is encoded upon the user's card.

FIG. 2 is a diagram representing the code format which appears on the user's card.

FIG. 3 is a general flow diagram of the control function enabling procedure of the present invention.

FIG. 4 is a table of the control function codes carried by the cards used in the present invention.

FIG. 5 is a table illustrating the permitted transactions for each of the possible control function codes of FIG. 4.

GENERAL DESCRIPTION OF SYSTEM AND OPERATION

Figure 6:
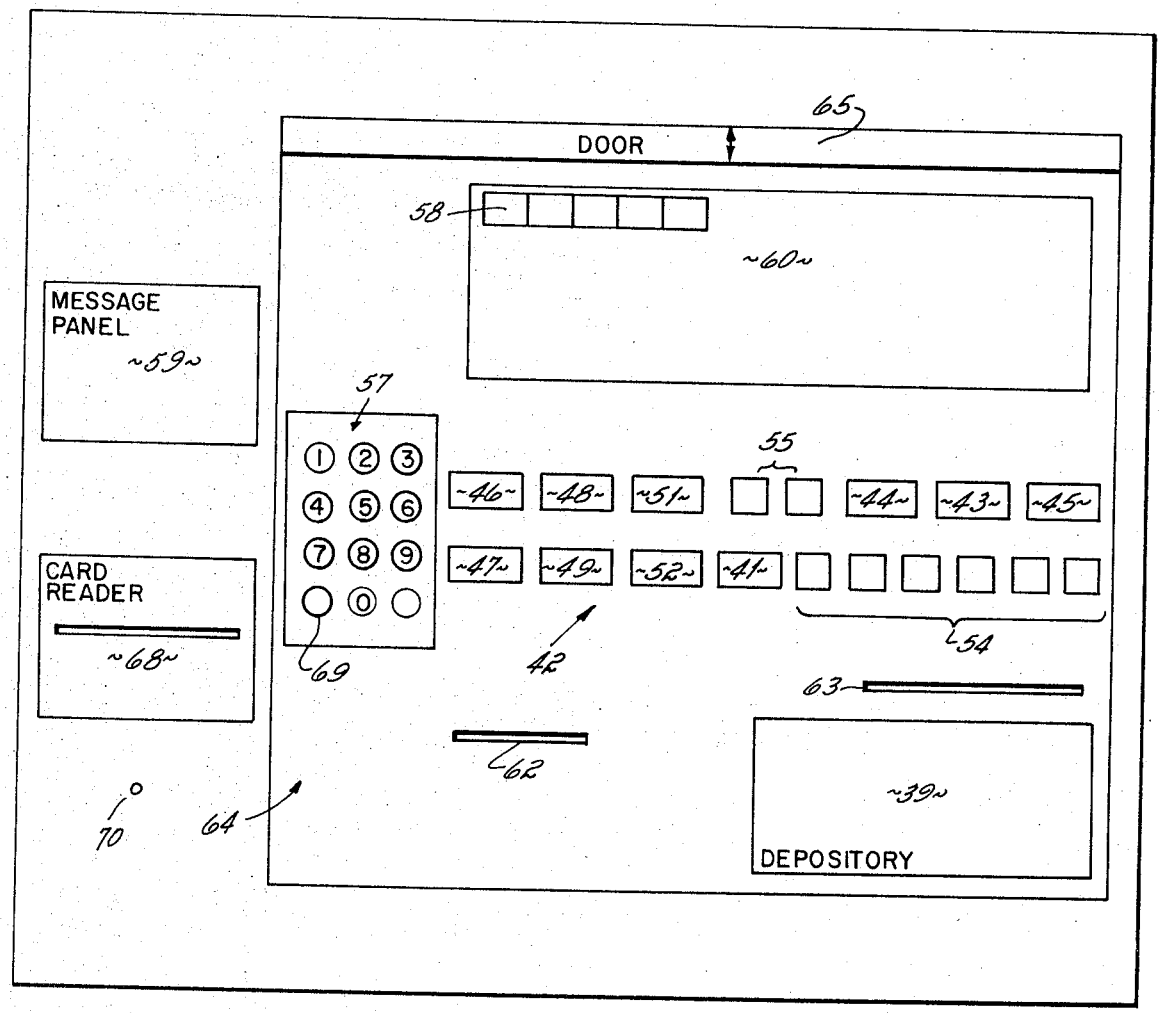
FIG. 6 is an elevational drawing of the panel of a cash dispenser unit embodying the principles of the present invention.

FIG. 1 illustrates the four basic fields of information which are provided to maintain current user line of credit information of his personal card. These fields include a dollar amount field 10 which contains generally fixed data representative of the maximum amount of credit permitted during a given usage interval. The data further includes a field 11 which is encoded with information indicating the amount of credit remaining during the current usage interval. This information is generally variable, being reduced by the amount of each cash transaction each time the user makes a withdrawal with his card. The information further includes a fixed data field 12 which indicates the length of the usage interval for the particular holder of the card. The fourth data field 13 includes information representing the next usage day. This information is generally variable and is revised each time the card holder exhausts his credit limit. Specifically, the field 13 contains a number representative of the calendar day of the year. If the day upon which the card is used falls before the day appearing in this field, no transaction will be permitted. If it is more than the usage interval before the current calendar day, it is reset to the current calendar day, and the amount remaining in field 11 is rewritten to the maximum amount in field 10. If the current calendar day is, however, a day equal to or later than this usage day, transaction will be permitted up to the amount appearing in the field 11. When the number in the field 11 is reduced to zero, the next usage day appearing in field 13 will be rewritten to correspond to original usage day plus the usage interval field 12. When the card is so rewritten, the amount remaining in field 11 will be rewritten to the maximum limit appearing in the dollar amount field 10. The data represented in the diagram of FIG. 1 is that for a card holder whose renewable credit card limit is $100 for a seven-day usage interval.

The precise format of the card of the user is illustrated in FIG. 2. This card is encoded in a 40-character word 20. This word 20 is divided into several fields. The first field is one character long and is the start sentinal field 21 which initiates the reader logic. The second field is the account number field 22 which occupies character positions 2-17. This includes an account number which identifies a specific user. The 18th character is a field separator 23. The next field 24 is a four-character expiration date field occupying character positions 19-22. The date included in this field is the expiration date of the card and no transactions will be permitted after this date. The account suffix field 25 includes the 23rd character of the word. This suffix is provided when a plurality of cards are issued for a single account, such as when different cards are provided for different members of a given family. The next field, fields 26, is the controlled code field which occupies character positions 24 and 25. The information encoded in this field is used by the system to enable the authorized transactions which the user may perform. The next field is the next usage date field 13 referred to in FIG. 1. It occupies character positions 26-29. The next field is the usage interval field 12 referred to in FIG. 1. It occupies only character position 30 of the word. Character positions 31 and 32 form the dollar credit limit field 10 of FIG. 1. The number encoded in this field represents the dollar amount in terms of the number of ten dollar bills which equal the dollar limit. The "amount remaining" field 11 referred to in FIG. 1 occupies positions 33 and 34 of the word. This amount, too, is encoded in terms of the number of ten dollar bills which equal the amount remaining. If the particular machine dispenses bills of other denominations, as for example, twenty dollar bills, the arithmetic logic of the machine can be programmed to double the bill count of the transaction when the card is rewritten or the bill count on the card could be standardized to reflect the number of other denomination bills. The next field is the bank code field 27 which occupies bit positions 35-38 of the word. This field contains a number which identifies the bank with which the account is maintained. In that these systems may be used for a plurality of banks, and that different systems may be used with different banks, this code field is provided to determine whether or not a card is being presented to a bank which authorizes its accounts transacted through the particular off-line unit. The final two fields 29 and 30 of the word relate to character positions 39 and 40 and contain machine operation codes which are of no interest to the present invention.

Referring now to FIG. 3, the general flow diagram representing the operation of the function selection portion of the system is illustrated. This diagram represents first the card read operation 35. In this operation, the data word 20 is read from the card. From this word, the controlled code digits are extracted and this is represented by step 36 in FIG. 3. The machine automatically performs the operation indicated in step 37 in which the machine will enable specific machine functions in accordance with the code extracted by step 36, and these enabled functions operate lighted push-button switches on the display panel of the machine so that the user can select the enabled and authorized transactions which he may perform.

In FIG. 4 is a table which illustrates the numerical codes used to indicate the various types of transactions and accounts available to a particular user and which codes are those present in field 26 of the word 20. The word 20 is coded in four-bit BCD representations of the decimal digits. Thus, the codes illustrated in FIG. 4 assign one bit to each of the respective permissible accounts and when a bit appears in that respective position of any one of the customer's credit cards, then that particular account is available to him. When any one account is authorized, transactions may be made to and from that account. When more than one account is authorized, transactions may be made to and from either of those accounts or between any two of those accounts.

The total permissible transactions available in the system illustrated are listed across the top of the chart of FIG. 5. The appropriate control codes which are available are listed down the left column of the chart. The marks in the chart adjacent each of the control codes illustrate those transactions which are available when the respective code is present on the card.

FIG. 6 represents a view of the panel 40 which is used in a system according to the present invention. The push-button function selectors 42 which relate to those transactions illustrated in the chart of FIG. 5 appear near the center of the panel. Of these function control buttons, the deposit button 41 is used for either loan payment, mortgage payment, or deposit to any account. Such deposits are made through the depository 39 and the final accounting therefor is made by the bank and does not effect information on the credit card. A cash-from-credit-card transaction is executed by use of button 43 while the cash-from-checking and -savings accounts are executed respectively by buttons 44 and 45. Transfers of funds from checking to savings and savings to checking accounts may be performed by the use of buttons 46 and 47 respectively while loans may be paid off to the bank by transfer of funds from checking and savings accounts respectively by use of buttons 48 and 49. Similarly, mortgage payments may be made from checking and savings accounts respectively by use of buttons 51 and 52.

When cash transactions are made, the amount of the transactions may be selected by the use of the transaction amount selector buttons 54. A pair of selector switches 55 are also provided for the user to use in selecting additional transactions after his first transaction is completed.

Other devices provided on the panel include a code entry keyboard 57. Numbers entered on the keyboard 57 are displayed on a keyboard display 58. Two display panels are provided by which the system communicates information to the customer. These include a message panel 59 which displays various messages usually indicating some irregularity in the attempted transaction and may, for instance, inform the customer to call the bank or that the bank will call him. A display panel 60 is also provided which communicates informational messages to the customer which inform him of the next operational step which he is to perform in executing his transaction.

Cash transactions will result in the dispensing of cash through a cash dispenser 62. Also, at the end of the transactional cycle, receipts are printed and dispensed to the customer through a receipt printer outlet 63. The functions controls enclosed within the panel section are covered by a door 65 which is operated by a door control controlled under the operation of the machine circuitry. The panel also includes the card reader-writer 68 into which the card is inserted and from which the card is returned updated at the end of the transaction. A card return button 70 is also provided for the user to cancel his transaction before execution begins.

Figure 7:
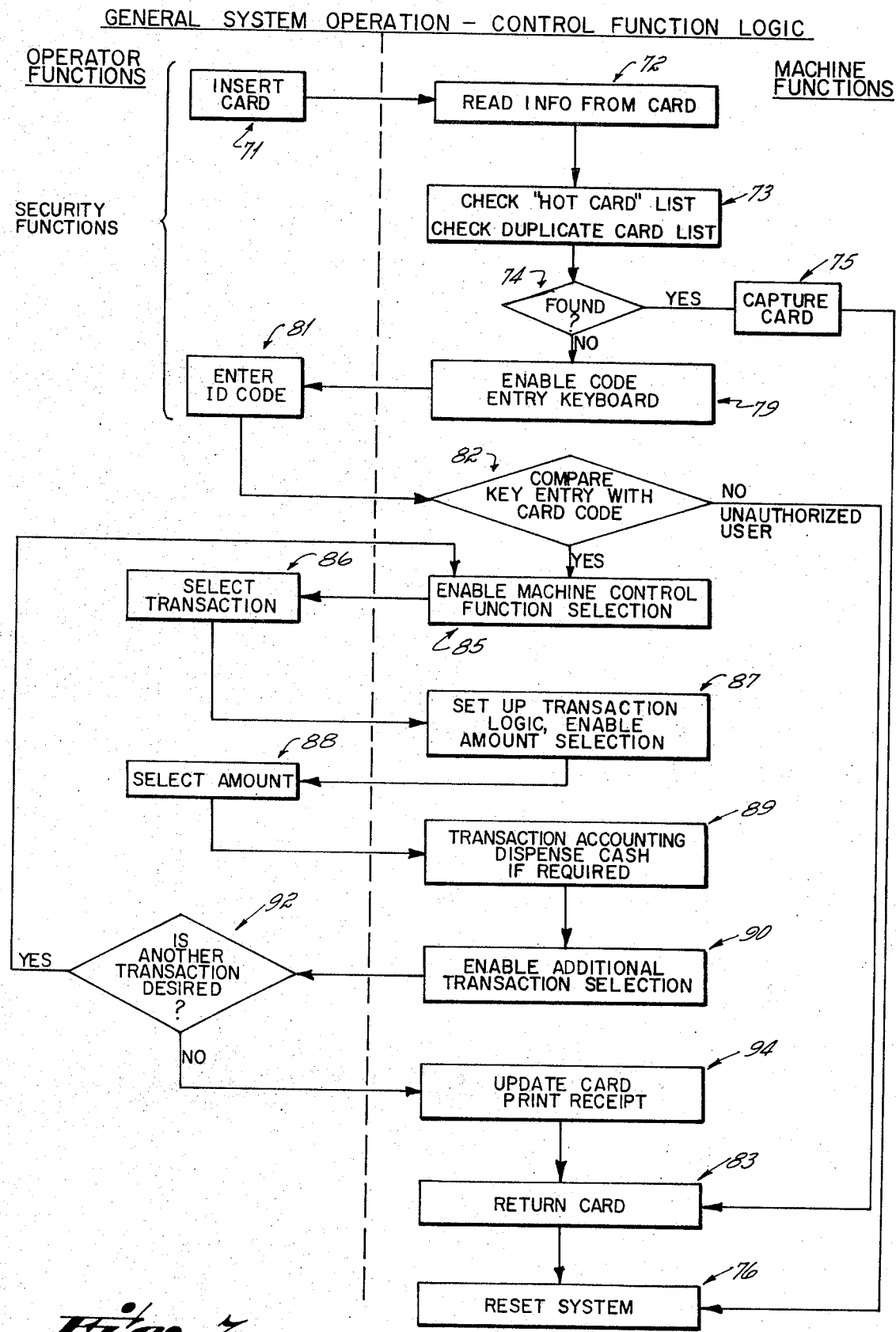
FIG. 7 is a flow chart diagram illustrating the general system operation of the unit of FIG. 6.

The general system operation will be better understood by reference jointly to the panel drawing of FIG. 6 and the general system operation flow diagram of FIG. 7 here to be described.

The functions in FIG. 7 are divided into those functions which are performed by the user or operator on the panel 40 and those functions which are performed automatically by the machine. Initially, door 66 on the panel is closed covering those controls behind it. The user approaches the panel and inserts a card through the card reader slot 68 as represented by the step 71 in FIG. 7. The machine then reads the information from the card as represented by step 72 and then performs a file check of the hot-card list and the duplicate card list, the operation of which will be explained in more detail below. This function is represented by step 73 in FIG. 7. If the card is on the hot-card or duplicate card list, this decision is indicated by a function 74 of FIG. 7 and the card is then captured and no transactions are thereby permitted with that card. The card capture is represented by step 75. After the card is captured, the system will reset as represented by step 76. If no image of the card is found in either the hot-card or duplicate card list, the code entry keyboard 57 is enabled, as represented by step 79 in FIG. 7, and a message reading "enter code" will be displayed on the panel 60.

The user then enters a secret code on the keyboard 57 as represented by the step 81 in FIG. 7. When the code is entered, the machine proceeds to compare this code with a code derived from that information encoded and read from the card. This comparison test is made at 82 in the diagram of FIG. 7. If an improper code is entered, the use in unauthorized and the card is returned to the user as represented by step 83 and the system is then reset according to step 76 of the drawing. If the proper code is entered, the system proceeds to enable certain machine codes as read from the card in accordance with that table represented in FIG. 5. This enabling function is represented by the step 85 in FIG. 7. The enabling function performed in step 85 will illuminate those function selectors 42 which correspond to the authorized transactions and a message "select transaction" will be displayed on the panel 60.

The user then depresses one of the illuminated select transaction buttons as represented by step 86. This selection enables the machine to execute the selected function as illustrated by step 87 in the diagram and then causes the transaction amount selector buttons 54 to be enabled and illuminated along with a message which reads "select amount" which is displayed on the panel 60. The user then selects the amounts of his cash transaction if it was a cash transaction which he selected by depression of the appropriate button of the selector 54. This selection function is represented by box 88 in the diagram.

Had the user not selected a cash transaction, but instead a transfer transaction of funds from one account to another or a deposit, he will enter this amount on the keyboard 57 which will have been illuminated by his selection of such a transaction along with appropriate message indicating that he should thereby enter the amount on the keyboard 57 which informational message will be displayed on the panel 60. The amount that he does enter on the keyboard 57 will be displayed on the display register 58 and then by depression of the transaction complete button 69 on panel 57 will cause that transaction to be executed within the internal accounting mechanism of the system.

Whatever transaction is selected, the operation will proceed in accordance with the machine controls as represented by the step 89 in FIG. 7. When the transaction is completed and the cash dispensed, if so required, the user is given an opportunity to perform another transaction and the additional transaction selection is enabled as represented by the step 90 in FIG. 7. This function will display a message reading "select another transaction" on the panel 60 and the decision buttons 55 will be illuminated for the user to actuate. If another transaction is desired, the user selects the appropriate buttom 55 as represented by the step 92 in FIG. 7. If the user does select another transaction, control will return to the step 85 in FIG. 7. If the user selects no other transaction, the machine will enter the exit function mode as represented by step 94 in FIG. 7 which will cause the card to be updated if a cash transaction has been made and will also cause a receipt of all the transactions executed to be printed and then return control to the return card function 83 and then the system reset function 76 and the system will thereafter cause the door 65 to be closed and stand ready for the next customer.

Figure 8:
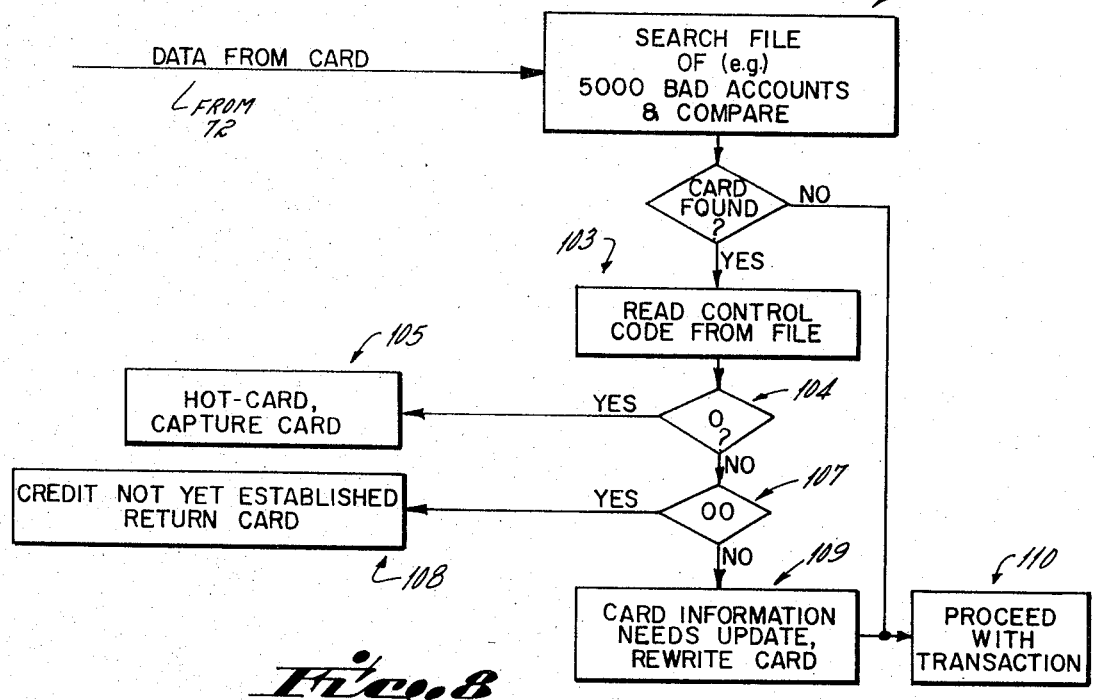
FIG. 8 is a general flow chart diagram of the "hot card" list check operation portion of FIG. 7.

Referring now in more particular detail to the security option of the hot-card list check, this procedure is generally functionally shown in the flow chart of FIG. 8. This is one of the functions represented by the box 73 in FIG. 7. The data from the card is received by a comparison circuit from step 72 and the search of a disc file is thereby executed. The card information is compared with that found in each position of the disc file. This comparison and search function is represented by the step 101 in FIG. 8. The comparison function checks to see if the account number of the file matches that account number read from the card. If a match is found, then the control code from the word in the disc file is interrogated as represented by step 103 of FIG. 8. In the specific example taken, if this control code is zero, it is detected by decision operation 104. This code indicates that the record was placed on the file to indicate that the account number referred to is either of a stolen card or a card of a holder whose credit was to be terminated for some reason, and that the bank should capture or retain the card. This capture function is executed by the step 105 in FIG. 8. In other instances, a new card holder may be denied use of his card if clearance has not yet been made by the bank and this account may appear in the hot-card file. The card code double zero, for example, as represented by the decision circuit 107 will detect this fact and merely return the card to the customer and cause a message to be displayed indicating he should wait for a certain period of time before using this card. This operation is represented by the step 108 in FIG. 8.

If the card was found in the file and if neither of the two operations above represented by positions 104 and 107 have been indicated with the positive result, then, the information will indicate that the card should be updated with new information from the disc file. This operation is represented by the step 109 in FIG. 8. After this update, or if no match is found in the file, this system will proceed with normal transactions (Step 110).

Figure 9:
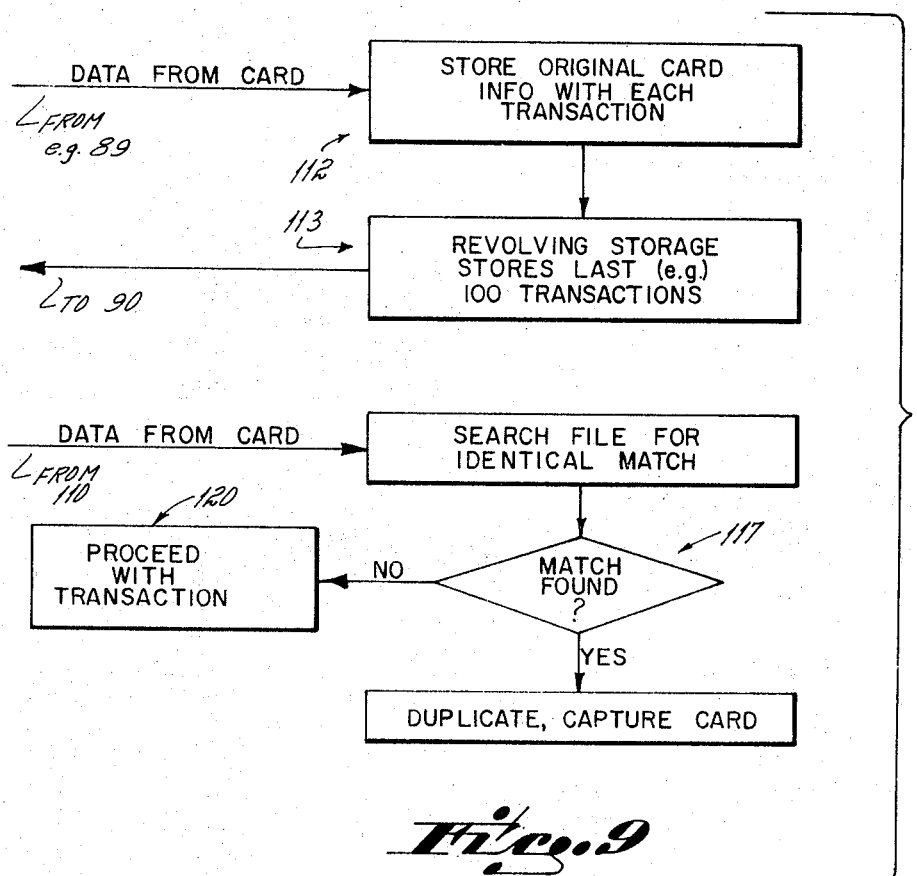
FIG. 9 is a general flow chart diagram of the duplicate card detection portion of the operation of FIG. 7.

FIG. 9 represents a general functional block diagram of the operation involved in the duplicate card detection function represented in step 73 of FIG. 7. This is functionally separated from FIG. 8 for illustration purposes but may be performed in a common functional operation. The duplicate card list is generated on the file by recording each card after each cash transaction is performed, for example, at step 89 of FIG. 7. This information from the original card as it was inserted into the machine is recorded after each transaction as represented by step 112 of FIG. 9. The revolving storage file is thereby generated containing images of cards inserted in the last, for example, 100 transactions. This is represented by step 113.

The interrogation of the duplicate card file may be made in the same manner as the hot-card file search. The data read from the card is compared with the data in the duplicate card file, and when an identical copy is found, this is indicated in the step 117 and a card capture is commanded. Since each card is revised after each cash transaction, the exact match will indicate that the card has been duplicated and thus, its use is not permitted. When no match is found, the system proceeds with normal transactions as indicated by step 120.

DETAILS OF SYSTEM AND OPERATION

Figure 10:
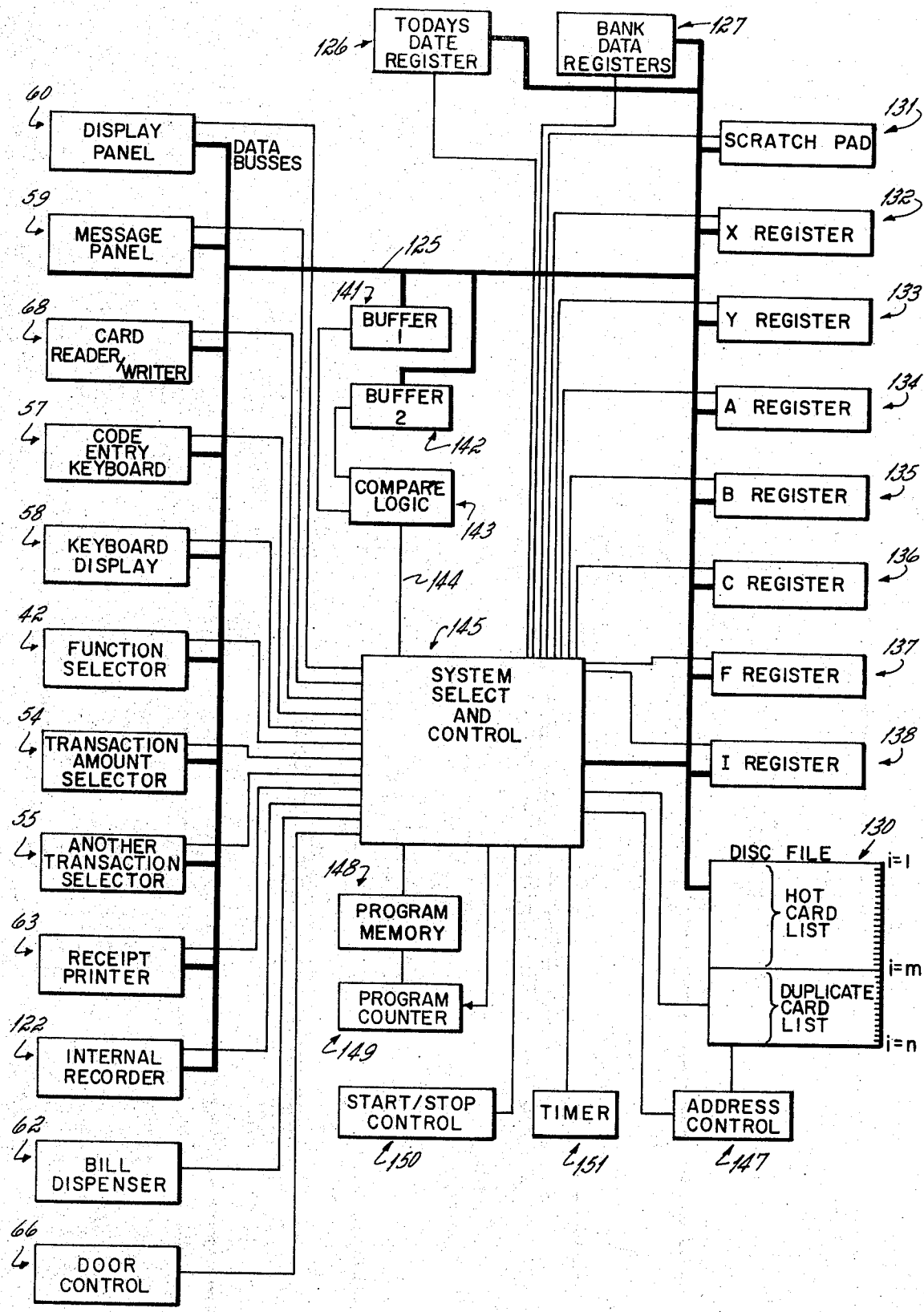
FIG. 10 is a block diagram of the controls and logic of the system associated with the unit of FIG. 6.
Figure 11:
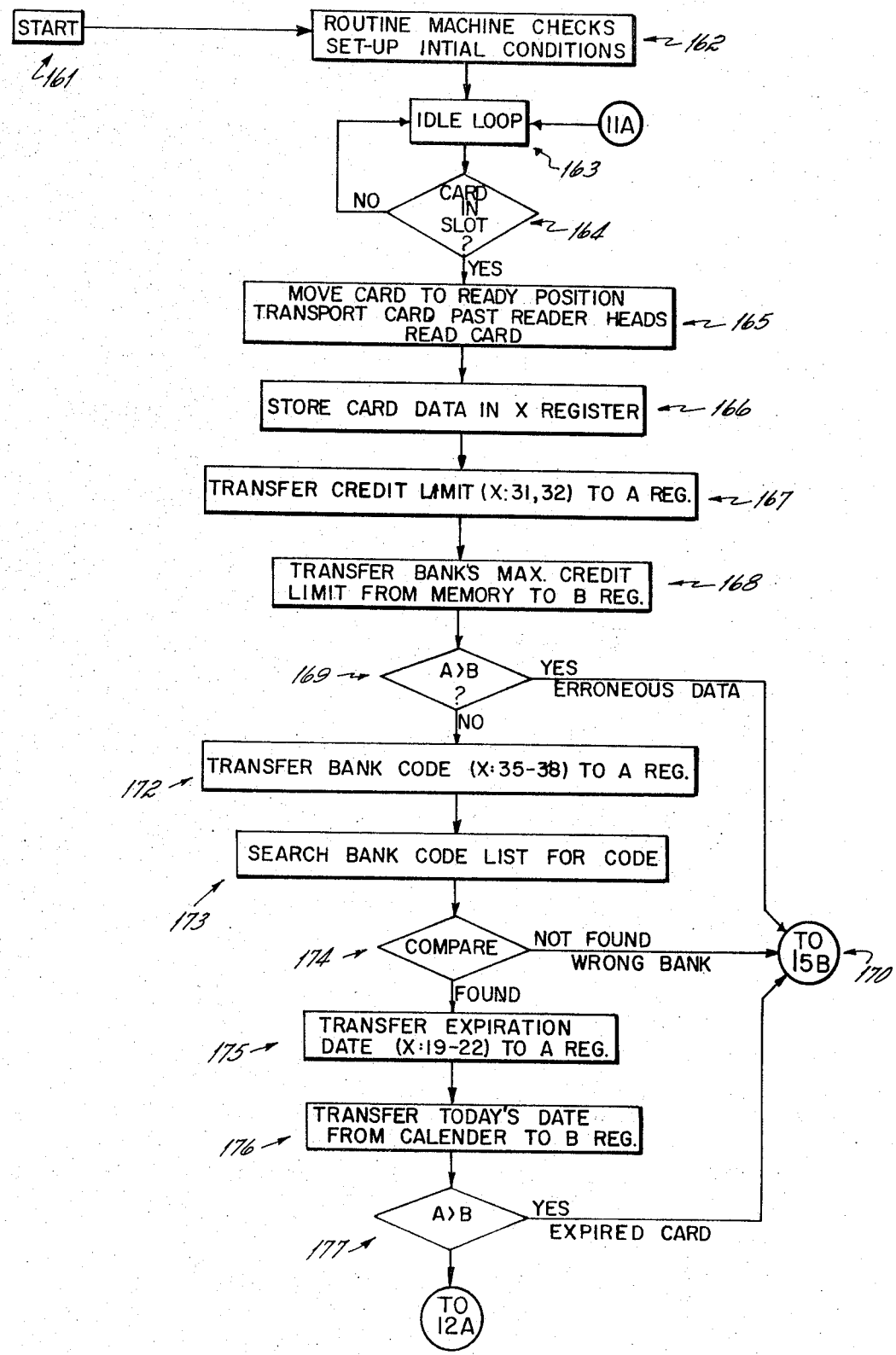
FIG. 11 is a more detailed flow chart representation of the operation of FIG. 7 illustrating particularly the initial condition set up and check procedure.

The following is a detailed description of flow charts representing the operation of the specific embodiment of the present invention. This will be, however, better understood when the general elements of the controls of the system are briefly described. These are represented in FIG. 10. The system includes the panel control and items described in connection with FIG. 6 which are the display panel 60, the message panel 59, the card reader-writer 68, the code entry keyboard 57, the keyboard display 58, the function selector switches 42, the transactional amount selector switches 54, the additional transaction selector switches 55, the receipt printer 63, the cash dispenser 62 and a door control 66 which operates the door 65. Also an internal accounting recorder 122 is provided which performs certain recording and arithmetic operations for the bank record system. The date handling components of the panel 40 have data outputs connected to a general data buss 125. Also connected to this buss are internal registers which include a today's date register or calendar 126, a bank data register or set of register 127, and a disc file 130 which includes the hot-card and duplicate card lists. The contents of the bank data register 127 may be stored on the disc file 130. Also, several registers are provided for date handling. These include the scratch pad register 131, and X register 132, a Y register 133 and A, B, C, F and I registers 134, 135, 136, 137, and 138, respectively. The system is also provided with, symbolically, a pair of buffer register 141 and 142 having data inputs connected to the data buss 125. These buffers represent storage registers on which the comparison logic 143 operates to deliver decisional information along line 144 to the system select and control unit 145. The system select and control unit 145 has control outputs connected to each of the above mentioned components and registers of the system. The system 145 also controls an address control 147 which operates the searching function of the disc file 130. The system select and control unit 145 operates under the control of a program memory 148 which is directly driven by a program counter 149. A stop-start control 150 and a timer 151 also deliver information to the system select and control unit 145 for the control thereof. With this general diagrammatic discussion of system hardware, the detailed operational flow charts of FIGS. 11-15 can better be understood.

With reference back to FIG. 10, throughout the discussion of FIGS. 11-15, the machine operation starts with the energization of the system as represented by a start command 161 through operation of the start control 150. This causes the execution of certain routine machine checks and the setting of initial conditions, such as the clearing of the registers, etc. This is represented by step 162 in FIG. 11. When the machine has been set up, the control passes into an idle loop 163 where it remains until a card is inserted into the slot 68 (FIG. 6). When this card is detected in step 164, the card reader 68 is caused to read the card in step 165 and store the entire data read therefrom in the X register 132 at step 166. The customer's credit limit is then transferred from the positions 31–32 from X register 132 to an A register 134 in step 167. Then, the banks maximum credit limit is transferred from one of the bank data registers 127 to the B register 135 in step 168. Then a check is made in step 169 to determine whether or not in fact the limit on the card is a legal limit. If it is not, there is a card error and the program exits through an exit 170. If the limit is a legally authorized limit, the machine proceeds by transferring the bank code from positions 35–38 of X register 132, in step 172, to the A register 134. Then the bank data registers 127 are searched for the bank code lists to determine whether or not the customer has used the unit associated with his bank. This is represented by step 173.

If the bank code information is not found, the customer has used the wrong bank and an exit is made through exit 170. If it is found, the transaction proceeds as normal. This check is represented by step 174 in FIG. 11. This step may also be programmed to permit limited types of transactions against accounts of associated banks or national credit cards. For example, it may be desirable to permit cash transactions against accounts of out of town banks or national credit cards to accommodate travelers. If this is the case, the function selection steps of FIG. 13 will be modified in accordance with the information contained in the bank data registers 127.

The procedure then transfers the expiration date from positions 19–22 of the X register 132 to the A register 134 as represented by step 175. Then today's date is transferred from the "today's date" register 126 to the B register 135 in step 176. A decision is then made in step 177 whether or not the card has expired. If it has, exit is made through exit 170, and if it has not, control proceeds to path 12A of FIG. 12.

Figure 12:
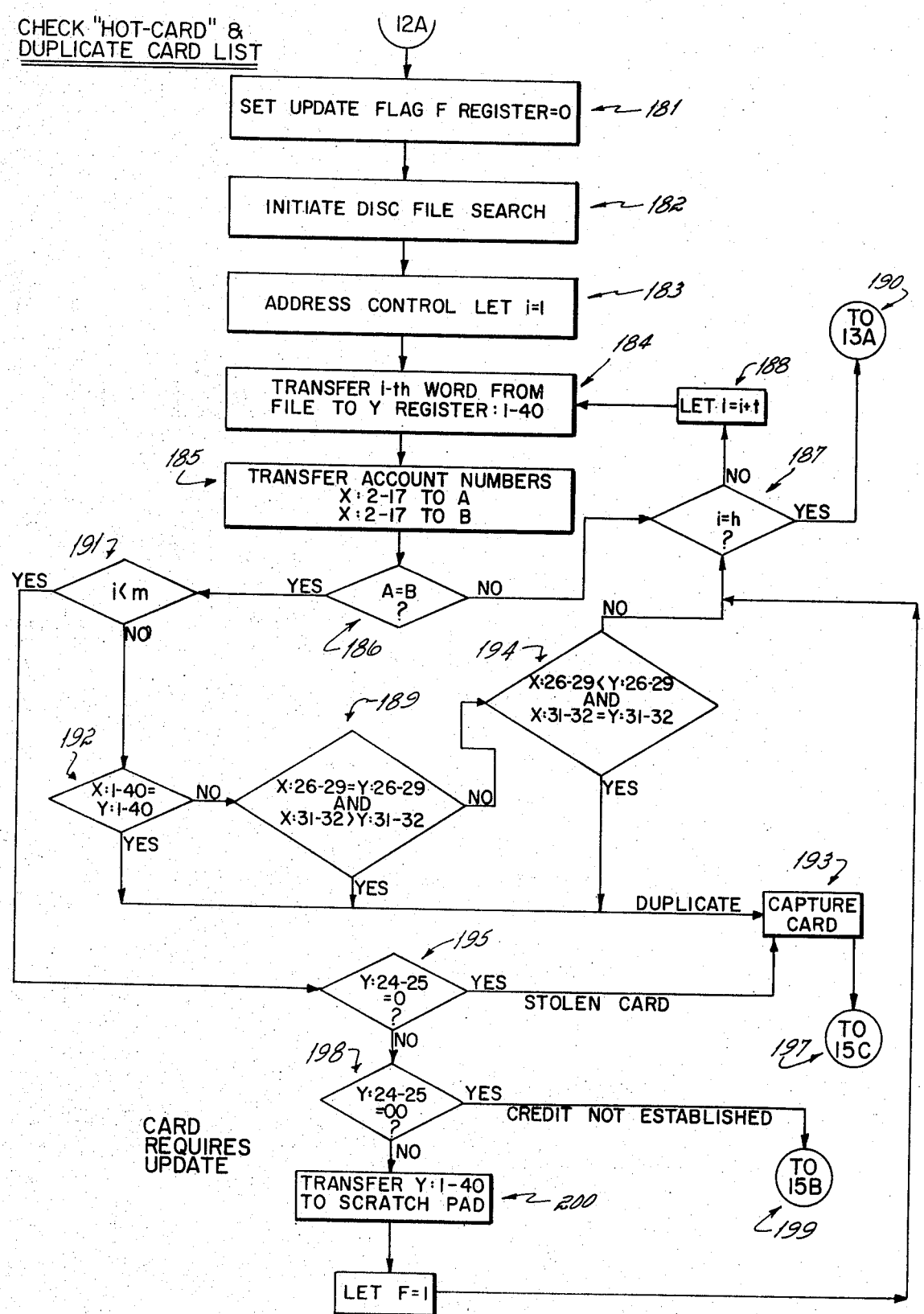
FIG. 12 is a detailed flow chart diagram of the procedure of FIG. 7 in an illustrating more particularly the "hot card" and duplicate card list check procedures which were isolated in FIGS. 8 and 9.

Referring to FIG. 12, the first step performed is the clearing the update flag register F, 137, for reasons which will become apparent from the description below. This is done in step 181. The operation then proceeds with interrogation of the hot-card and duplicate card lists. All of these steps, incidentally, are being actuated by the system selecting control unit 145 under direction of the program memory 148 which in turn is controlled by the program counter 149.

The disc file search is initiated by actuating the address control 147. This is shown in step 182. First, the index register 138 is set to index the position 1 in step 183. The, the i-th word is transferred from the disc file 130 to the Y register 133 in step 184. Then, the account number portion in bit position 2–17 of the X register 132 is transferred to A register 134 and the account number positions 2–17 of Y register 113 are transferred to the B register 135. This is done in step 185. Then, the A and B registers are compared in step 186 and, if no match is found, the I register 138 is tested in step 187 to see if the file has been completely searched and, if not, the I register 138 is incremented in step 188 and the next i-th word is retrieved from the disc file and comparison in turn will proceed until the entire file has been scanned. If no match is found, a normal exit will be made through exit 190.

If an account number match is found in the comparison step 186, the index register 138 is checked in step 191 to determine whether the match was found in the hot-card list or the duplicate card list. If in the duplicate card list, the entire contents of the X and Y registers are compared in step 192 to see if there is a total match and if so, a duplicate card decision is made and the card is captured in step 193. If these are not a complete match, then further checks are made to catch abnormal conditions found only on fraudulent cards. These steps include step 189 in which a check is made for the abnormal condition in which the amount remaining is the same but the next usage date on the card is later than the one in storage. Also in step 194 a check is made for the abnormal condition in which the usage dates are the same but the amount remaining is greater on the card than on the disc, then the search loop proceeds through the decision step 187.

If the match was found in the hot-card list, the first comparision is made in step 195 to see if the control code field positions 24 and 25 of the Y register equal zero. If they do, this indicates a stolen card, for example, and control proceeds through the card capture step 193. Whereafter control proceeds to exit 197.

If the control code is not zero, it is then checked for a double zero code in step 198 which indicates that the card has been prematurely used, in which case, an exit is made through exit 199. If the entry decision boxes 195 or 198 is affirmative, then the appearance of the match on the hot-card list indicates that it was put there for purposes for updating the card of the user. Then, the contents of the Y register 133 are transferred to the scratch pad register 131 for future reference in writing the card before it is returned to the customer. This is done in step 200. In step 201, the update flag is set to condition the machine to rewrite the card before it is returned to the user. After this, the system returns to the search loop through decision step 187.

Figure 13:
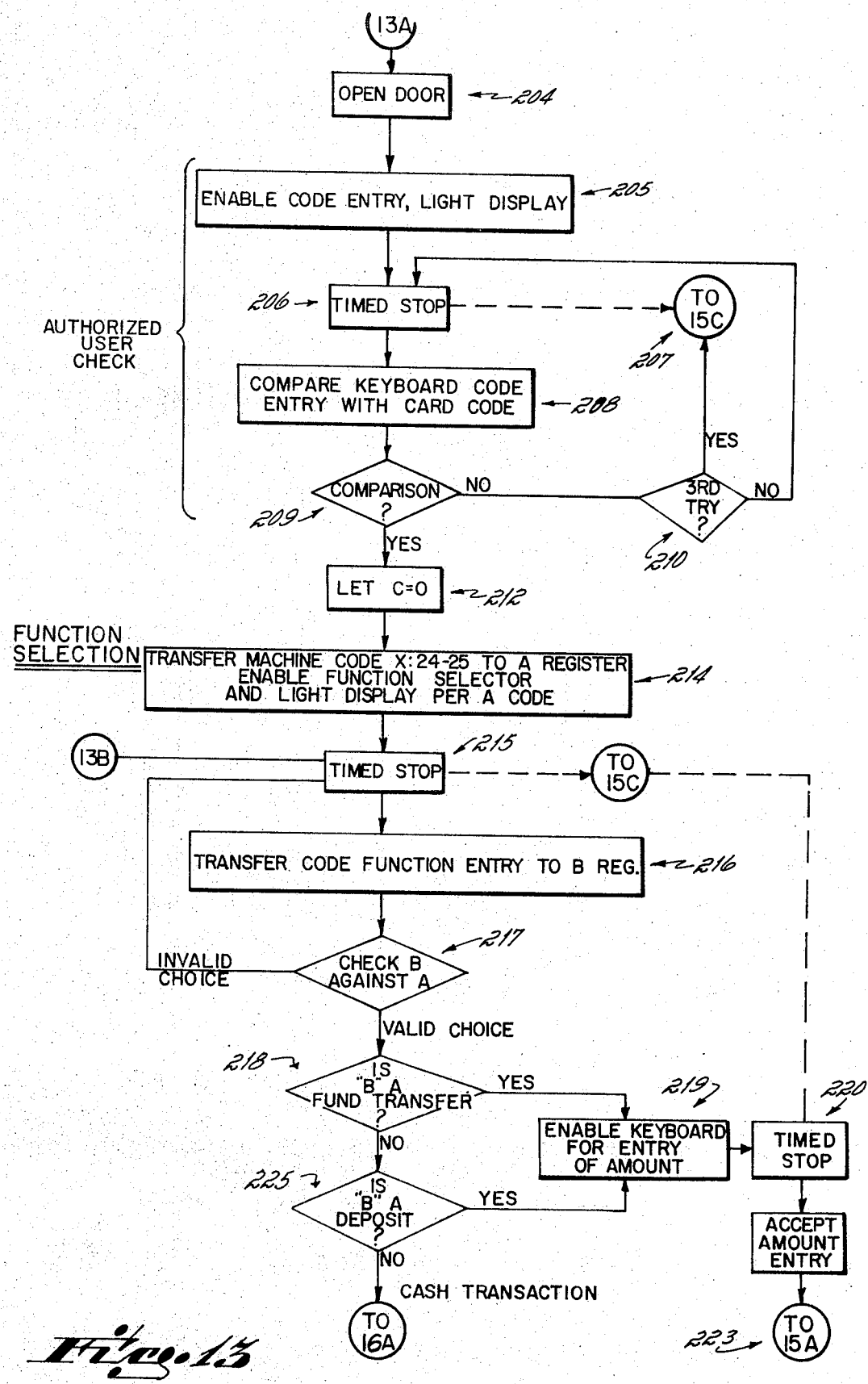
FIG. 13 is a more detailed flow chart diagram of the procedure of FIG. 7 illustrating particularly the authorized user check portion and the function selection procedure portion which was isolated in the diagram of FIG. 3.

The normal exit 190 from FIG. 12 proceeds to branch 13A of FIG. 13. Now, an appropriate transaction can be made and the doors open uncovering the panel section 69. This is done in step 204. Then, the coded entry keyboard 57 is enabled through step 205 and a message is displayed for the user to enter the proper code. The machine then goes into a timed stop in step 206. The timed stops 206 are controlled by timer 151 and, if an operator decision is not made within a specified time of, for example, 15 seconds, the machine will make an exit through exit 207. When the operator does enter a code through keyboard 57, as indicated in step 208, this code is compared in step 209 with one derived from the card which was read. If there is no match, the user is permitted two more tries through a counting loop 210. If the user fails in, for example, three tries, the exit 207 is used and the card will be returned to him. The number of tries allowed is a bank presettable number. If a proper comparison is made, the function selection operation proceeds with the setting of the count register 136 to zero in step 212. The system can also be programmed to allow only a limited set of failures by the user in arriving at the user code. This is desirable so that a user cannot attempt an infinite number of tries as he might with a stolen card. This can be done by marking the card when the card is returned for this reason. The marking may be done by replacing, for example, the account suffix digit on the card with an unused number. When the mark is detected in a subsequent failure to enter the card, the card is captured.

Function selection begins with the transfer of the machine code as read from the card and as stored in positions 24 and 25 of the X register 132 to the A register 134 in step 214. This code enables the appropriate function selector switches 42 in accordance with the table of FIG. 5 and displays the message "select transaction" on the display panel 60. The machine then goes into a timed stop in step 215. When a code function selection is made, it is stored in the B register 134 in step 216. Then the A and B registers are compared in step 217 to see if a proper choice has been made. If not, control returns to the timed stop 215.

When the choice is made, a test is made in step 218 to determine whether the control in the B register is fund transfer. If it is, the keyboard 57 is enabled for entry of the amount in step 219. The machine then proceeds to a time stop in step 220. When the amount has been entered (step 221) on keyboard 57 and displayed in the display 58 provided therefore, the machine exits through exit 223.

If the code in B is not a fund transfer, it is tested to determine whether or not it is a deposit in step 225. If it is a deposit, control passes again to step 219. If neither tests 218 nor 225 are affirmative, then the selection is a cash transaction and control passes to branch 16A in FIG. 16.

Figure 16:
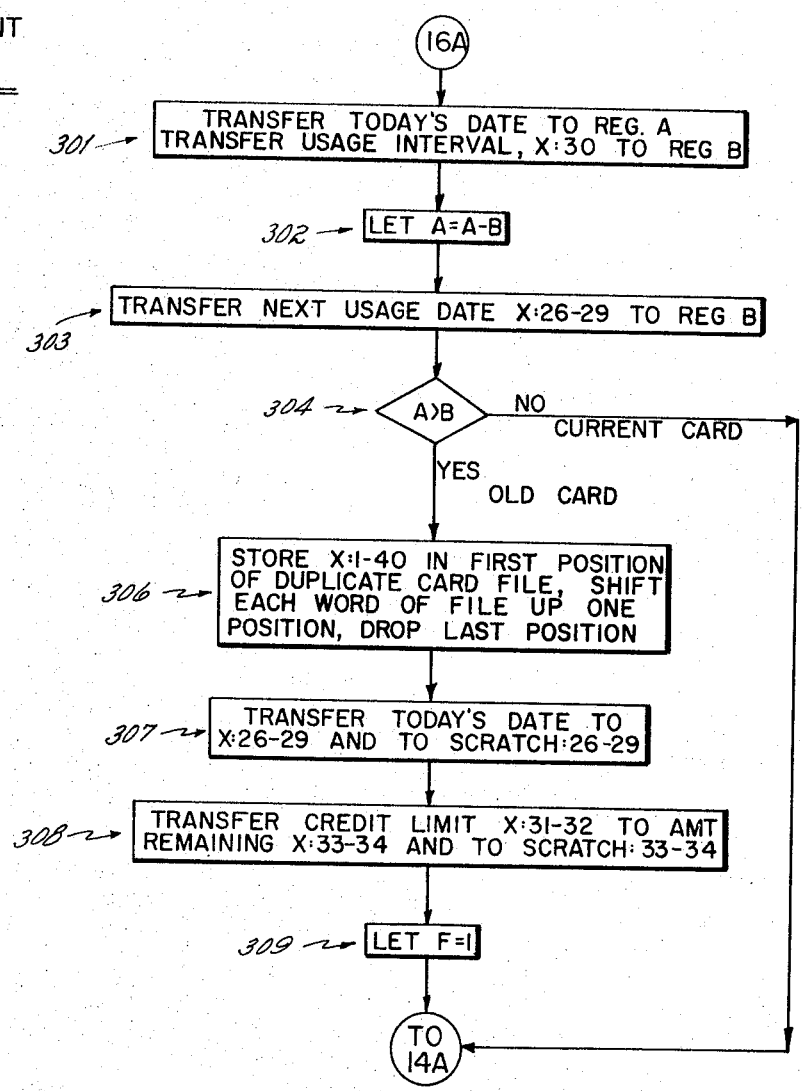
FIG. 16 is a detailed flow chart diagram of the "current card check" portion of the procedure of FIG. 7.

In FIG. 16 a check is made to determine whether or not the card inserted is a current card, that is, whether or not an entire usage interval has elapsed since the card was last used. Frequently, a customer may use his card to withdraw cash in an amount less than the total amount permitted during a usage interval, and then not make another cash transaction for some time. In such a case, his card would not be normally updated until the amount remaining has reached zero, in which case he would not reuse his card to withdraw cash until a usage interval has elapsed again. To overcome this condition, the usage date is checked here, and if it is more than the usage interval old, his entire amount is restored and the usage date is set to the current calendar date, thus providing a new effective cash transaction limit and next usage date.

This is done by transferring the calendar date from register 126 to the A register 134 and the usage interval from the card, as stored in position X:30 of X register 132, to the B register 135, in step 301. The B register 135 is then subtracted from the A register 134 in step 302, and the next usage date is transferred from positions 26-29 of X register 132 to the B register 135, in step 303. Then the A register 134 and B register 135 are compared in step 304. If the card is current, the procedure proceeds to branch 14A and FIG. 14. If the card is not current, the card image in X register 132 is stored in the duplicate card list of the disc file 130. As will be seen when FIG. 15 is described below, a cash transaction involving a non-current card results in two images being stored in the duplicate card list, one being that of the non-current information, and the other being that of revised card before the execution of the transaction, that is, which contains the effective usage date and current remaining information. If this were not done, and only the non-current card image stored, a person could duplicate cards and use them, one at a time, at wide intervals, thus obtaining a supply of different appearing cards. Then he could wait until all cards are non-current, and use them all on the same day, exceeding his credit limit, without an image being found in the duplicate card file. If only the effective image were stored, duplicate non-current cards would not be detected. By storing both images, this fraudulent conduct would be detected. Thus, the extra storage step 306 is necessary.

The provision for the effective next usage date is accomplished by step 307 in which today's day is transferred from register 126 to positions 26-29 of the X register 132 to provide the effective usage date, and also to positions 26-29 of the scratch pad 131 for rewriting of the card if the amount limit is not exhausted. Similarly, the maximum credit limit is transferred from positions 31-32 of the X register 132 to the amount remaining positions 33-34 of the X register 132 and the scratch pad 131, in step 308. When the flag register 137 is set to one in step 309 to indicate that the card must be rewritten. Control then proceeds to branch 14A and FIG. 14.

Figure 14:
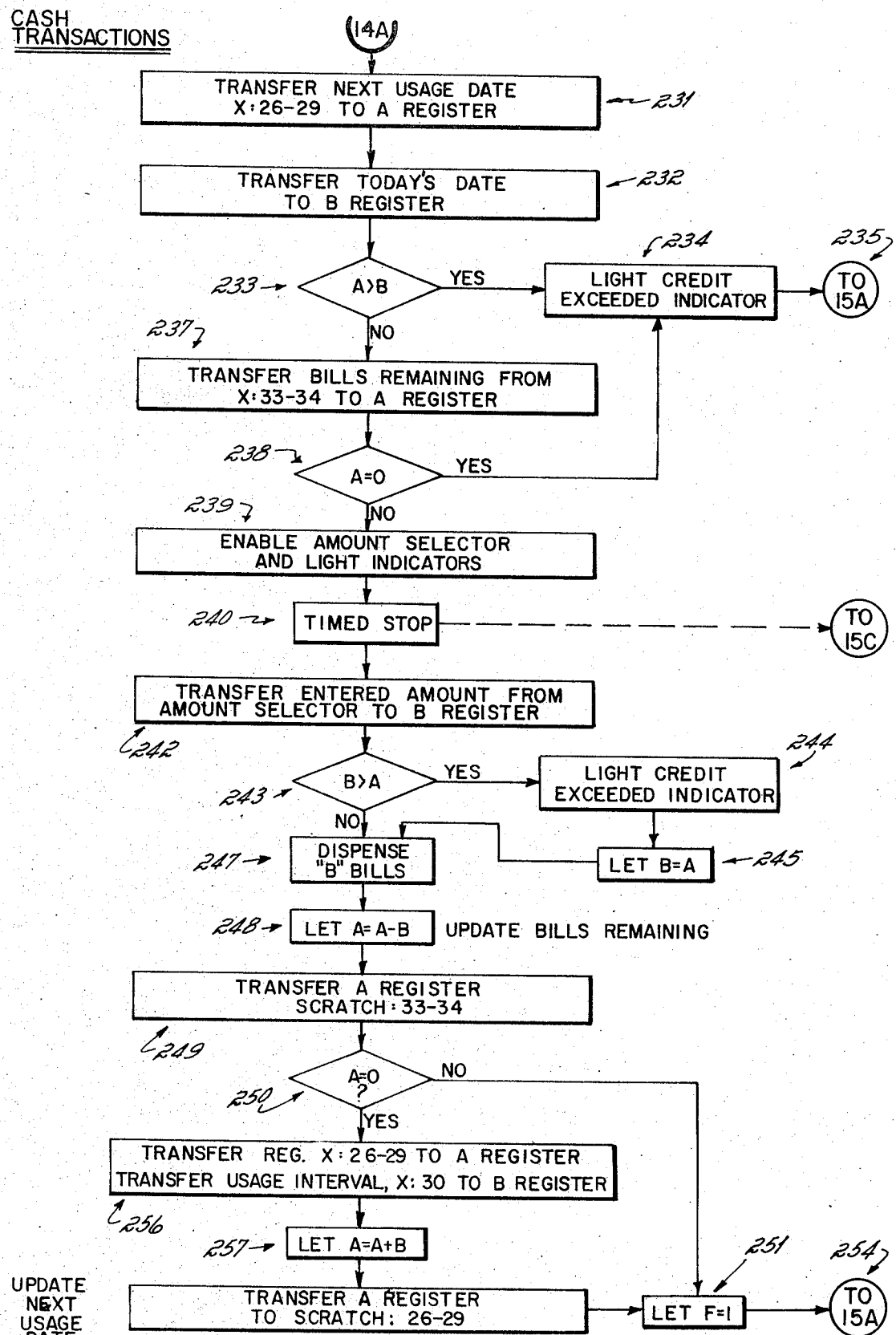
FIG. 14 is a more detailed flow chart diagram of the procedure of FIG. 7 illustrating particularly the procedure involved in execution of cash transactions.
Figure 15:
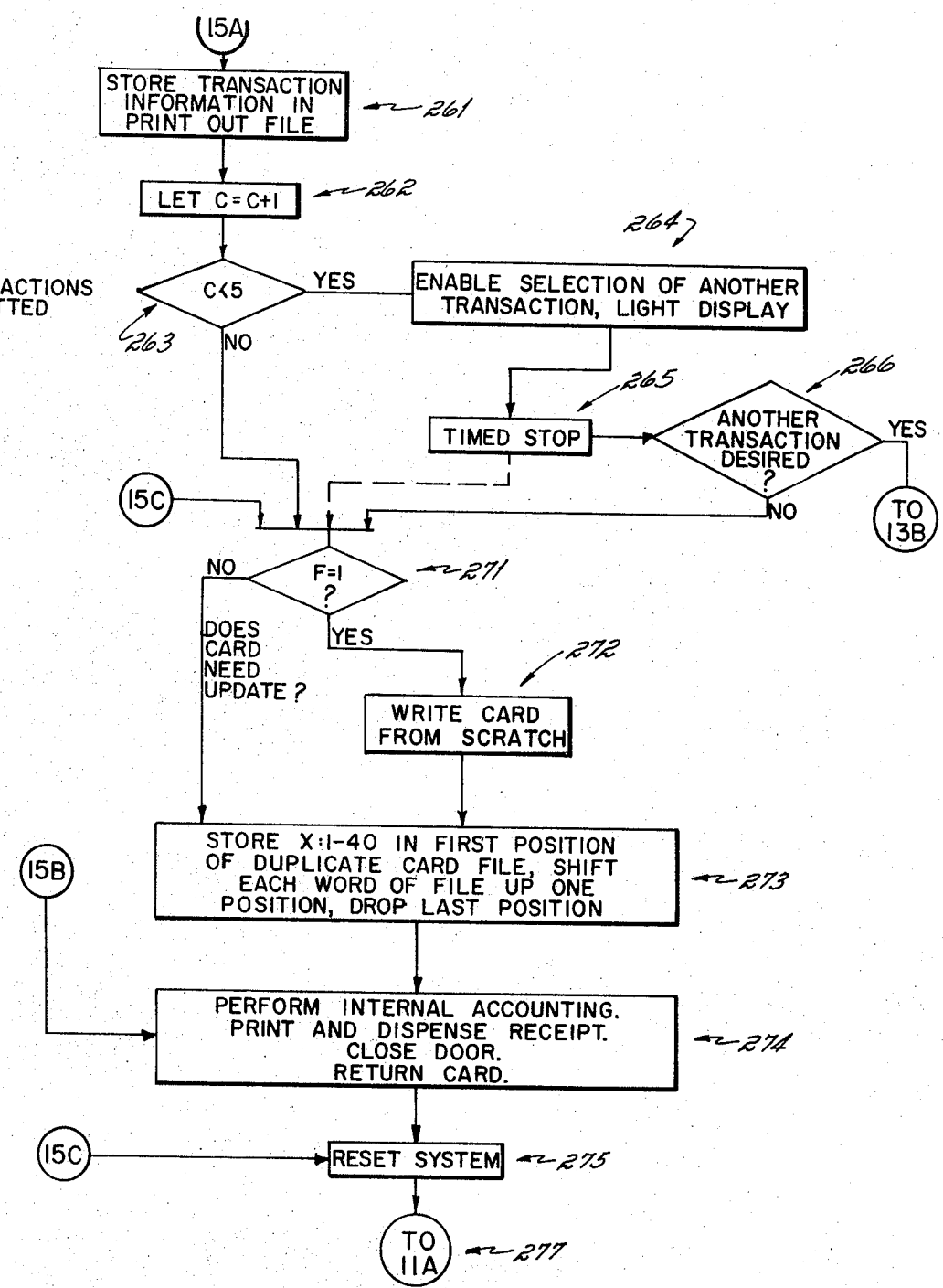
FIG. 15 is a more detailed flow chart diagram of the procedure of FIG. 7 illustrating more particularly the exit loop and final accounting and reset procedures.

In FIG. 14, for a cash transaction, first, the next usage date information is transferred from positions 26-29 of the X register 132 to A register 134. Then today's date is transferred to the B register 135 from today's register 126. These transfers are done in steps 231 and 232 respectively. Then, a check is made to determine whether the next usage date is later than today's date in decision step 233. If it is, a credit exceeded indicator light is lit on the message panel 59 at step 234 and exit is made through exit 235. If the next usage date is equal to or less than today's date, the bill's remaining information from positions 33 and 34 of X register 132 are transferred to A register 134 in step 237. Then the contents of the A register are interrogated in step 238 to determine whether any amount remains. If the amount is zero, the credit exceeded indicator light is lit as control returns to step 234 and exit is made through branch 235. If credit still remains, the amount selector switch 54 are enabled and the message "select amount" is displayed on the panel 50 in step 239. Then a timed stop is executed in step 240. Then, when an amount is entered through switches 54, the amount selected is transferred to the B register 134 in step 242. Then the A and B registers are compared and if the B register is greater than the A register, decision step 243 limits the credit to only the amount remaining and lights the credit extended indicator light on panel 59 through steps 244 and 245. Then, the system proceeds to dispense the selected number of bills through the bill dispenser 62 in step 247. Then, the number of bills dispensed is subtracted from the amount remaining in the A register step 248. This remainder is transferred to the scratch pad 131 for later writing and updating the card. This is done in step 249. Then, remaining amount in the A register is checked in step 250. If the amount is not zero, then the update flag from register 137 is set in step 251 and an exit is made through exit 254.

If the bills remaining amount has been reduced to zero as detected by decision 250, the usage date is transferred from positions 26-29 of X register 132 to the A register 130 and the usage interval is transferred from the 30th position of the X register 132 to the B register 135. This is done in step 256. Then, the contents of the A and B registers are added and the total representing the next usage date to be written on the card, is transferred to positions 26-29 of the scratch pad 131 for later writing on the card before it is returned to the customer. This is done in steps 257 and 258 after which the flag is set as control passes through step 251 to exit 254.

The various exit paths are illustrated in FIG. 15. The normal exit passes through branch 15A where the information indicating the occurrence of the transaction is stored in the print-out file of the internal recorder 122. This is done in step 261. Then, the C register is incremented in step 262 to indicate that one more transaction has been completed. In the next step, 263, a test is made to see whether or not five transactions have been completed. If less than five transactions have been conducted by the current user, the controls 55 are enabled to allow the customer to indicate whether or not he desires another transaction. This is done in step 264. Control then proceeds to a timed stop step 265 where, after another selection is indicated, control returns to branch 13B where the new selection of a transaction can be made. If, in decision 266, the user indicates that he wishes no more transactions or, if the fifth transaction in decision 263 has been detected, the final exit loop is executed wherein the card update flag 137 is checked in step 271. If updating of the card is required, the card is rewritten in step 272 wherein the contents of the scratch register 131 are transferred onto the card. After the writing step 272 or if no writing is required as detected by decision step 271, the exit step 273 is executed wherein the contents of the X register 132 are stored in the duplicate card file and each word in that file is shifted up on position with the last or, for example, 100th position information being dropped. Then, control passes to the final exit function step 274 wherein the internal accounting is performed in the recorder 122, a receipt is printed and the receipt is delivered to the customer by the receipt printer 63. The door control 66 is actuated to close the door 65, and the card is returned by the card reader 68 to the customer. The system then proceeds to reset in step 275 whereupon control is returned to the idle loop through final exit 277 whereupon the system waits for an insertion of a card by the next customer.

It will be appreciated from the detailed description immediately above that many variations of the system and the process may be made while achieving the objectives and advantages of the present invention according to the principles taught herein.

While cards are referred to throughout the specification and claims, it is intended that the use of records in any form may be substituted and accordingly such meaning is to be implied in the claims. Further, user identifying information need not be read into the system from a record ingested by the user, but may be the input of a memorized code via, for example, a keyboard, or may be some user identifying criteria such as, for example, a fingerprint.

Having described my invention, I claim:

1. An automatic banking system for serving a plurality of users and comprising:
   a device capable of accounting for different transactions involving a plurality of different accounts of a given one of said users, said transactions including debiting an account, crediting an account, and/or transferring funds between different accounts of said one user;
   means for selecting different transactions involving different ones of said accounts of a given one of said users;
   means for accepting from said one of said users information associated with said one user correlated to one or more of said transactions involving different accounts to which said one user is entitled, said information accepting means including a card reader for reading said information from a coded card; and
   means for enabling said selecting means to effect transactions involving different accounts selected by said user in accordance with said user associated information.

2. The system of claim 1 wherein:
   said cards are encoded with information representing the different accounts of said given user and with information representing the status of at least one of said different accounts; and
   said system further comprises means for updating said status information in accordance with the performed transactions.

3. The system of claim 2 further comprising:
   means for selecting the dollar amount of said selected transaction;
   said card status information including encoded information indicating a transaction amount limit permitted in a given usage interval; and
   means for limiting the amount of said transactions to the amount limit encoded on said card.

4. The system of claim 3 further comprising:
   means for revising said permitted amount limit information in accordance with the amount of the selected transaction.

5. The system of claim 4 further comprising:
   means for resetting said permitted amount limit information on said card to correlate to a maximum permitted value when said given usage interval has expired.

6. The system of claim 1 wherein:
   said cards are encoded with information relating to the identification of an authorized user,
   said system includes manual code entry means; and
   the operation of said system is conditioned on the results of a comparison between the information from said card and said code entry means.

7. The system of claim 1 further comprising:
   a memory unit containing a plurality of segments each containing information relating to the accounts of certain users;
   means for comparing said information accepted with that contained in said segments;
   means for modifying the operation of said system when the results of said comparison indicate that said information relates to that of one of said certain users, and
   means for revising said cards of said certain users in accordance with information stored in said memory.

8. The system of claim 1 further comprising:
   a memory unit containing a plurality of segments each containing information relating to the accounts of certain users;
   means for comparing said information accepted with that contained in said segments;
   means for modifying the operation of said system when the results of said comparison indicate that said information relates to that of one of said certain users, and
   means for capturing said card of said certain users.

9. The system of claim 1 further comprising a duplicate card detector including means for storing in said memory the images of a predetermined number of the cards last used in said system, means for comparing a presented card with said stored images to detect a duplicate card, and means for altering the operation of said accounting device in response to detection of said duplicate card.

10. A cash dispensing system comprising:

a card reader;

a plurality of cards encoded with
  a. information corresponding to the maximum transactional amount permitted to be dispensed during a given usage interval;
  b. information representing the length of said given usage interval;
  c. information representing the next permitted usage date; and
  d. information representing the current transaction amount limit of the current usage interval; and said system further comprising
  a. a cash dispenser;
  b. means for enabling said cash dispenser to dispense cash only when the current date is at least equal to said next usage date read from said card;
  c. means dispensing a selected amount of cash up to said current transaction limit;
  d. means for revising said current transaction limit by subtracting therefrom the amount of cash dispensed, and
  e. means for revising said next permitted usage date by adding thereto at least said usage interval and for replacing said current transaction limit with said maximum transactional amount when said limit equals zero as a result of said transaction.

11. An automatic banking system for serving a plurality of users comprising a card reader for reading information from a coded card;

a cash dispenser;

means for operating said cash dispenser to perform a cash dispensing transaction in association with the reading of said card;

means for changing the data encoded on said card upon the execution of said transaction;

a memory for storing the information read from said card during said cash transaction;

means for searching said memory, after the reading of a card and prior to the execution of said transaction, and for disabling said operating means upon the finding of a correspondence between the data read from the card and that stored in said memory.

12. The system of claim 11 wherein:

said memory is operative to store the information read from cards during a predetermined number of transactions immediately preceding the current transaction.

13. An automatic banking system for serving a plurality of users comprising:

a card reader for reading user identifying information and account information from a coded card;

a memory having stored therein information identifying a plurality of users and in association with said user identifying information additional information indicating that said account information on cards is to be revised in accordance with said additional information stored in said memory; and said system includes means for storing the information on the card read in accordance with the additional information in said memory existing at the time said card was read, when the account identifying information read from said card corresponds to information in said memory identifying an account with respect to which the additional information associated therewith is to be revised.

14. An automatic banking system for serving a plurality of users comprising:

a card reader for reading information from a coded card;

means for performing a banking transaction in accordance with a selected amount, which amount is limited by the information read from said card;

the information encoded on said card including:
  a. information relating to the maximum transactional amount permitted during a given usage interval,
  b. information relating to the permitted amount remaining during the current usage interval, and
  c. information relating to the commencement date of said current usage interval; and means for revising the information on said card to increase said remaining amount toward said maximum amount while altering said commencement date.

15. The system of claim 14 wherein:

the information on said card further comprises information relating to the length of said usage interval, and said commencement date represents the next permitted usage date; and said revising means is operative to alter said next permitted usage date to at least equal the current usage date plus said usage interval.

16. The system of claim 15 wherein:

said transaction performing means includes a cash dispenser operative to dispense cash in accordance with said selected amount;

said system further comprises means for further revising said remaining amount information by subtracting therefrom the selected amount of said transaction; and said first recited revising means being operative when said remaining amount equals zero.

17. The system of claim 14 further comprising:

means deriving an effective commencement date equal to the current calendar date and an effective amount remaining equal to said maximum amount when said commencement date read from said card is more than the given usage interval before the current calendar date.

18. A method for accounting for transactions involving a plurality of different accounts of a given one of a plurality of users, said transactions including debiting, crediting, and/or transferring funds between different accounts of said user, comprising the steps of:

accepting information from one of said users associated with said one of said users correlated to one or more of said transactions involving different accounts to which said one user is entitled, said information accepting step including reading a card coded with information representing the accounts of said one user and the status of at least one of said accounts;

enabling selecting means to permit selection of transactions by said one user involving different accounts in accordance with the information accepted from said one user;

activating said enabled selecting means to effect transactions involving different ones of said accounts of said one user; and updating the status of at least one of said one user's accounts to reflect said effected transaction.

19. The method of claim 18 wherein:

said encoded status information on said card includes information indicating a transaction amount limit permitted in a given usage interval; and said method further includes selected the dollar amount of said selected transaction and performing said transaction in an amount not greater than said permitted amount limit encoded on said card.

20. The method of claim 19 further comprising the step of:

revising said permitted amount limit information on said card in accordance with the selected amount of the selected transaction.

21. The method of claim 20 further comprising the step of:

resetting said permitted amount limit information on said card to a maximum permitted value when said given usage interval has expired.

22. The method of claim 18 wherein:

said status information encoded on said cards includes
 a. information corresponding to the maximum transactional amount permitted during a given usage interval;
 b. information representing the length of said given usage interval;
 c. information representing the next permitted usage date; and
 d. information representing the transactional amount limit of the current usage interval;

and said method further comprises the steps of:
 a. dispensing a selected amount of cash up to said transaction limit, but only when the current calendar date is at least equal to said next usage date encoded on said card;
 b. revising said transaction limit on said card by subtracting therefrom the amount of cash dispensed; and
 c. revising said next permitted usage date on said card by adding thereto at least said usage interval and replacing said transaction limit on said card with said maximum transactional amount when said limit equals zero as a result of said transaction.

23. The method of claim 18 wherein:

said cards are encoded with information relating to the identification of an authorized user, said method further includes the step of manually generating a user code, comparing information from said card with said manually generated code, and conditioning the execution of a transaction on the results of said comparison.

24. A method of claim 18 further comprising the steps of:

searching a memory unit containing a plurality of segments each containing information relating to the accounts of certain users to retrieve said information therefrom;

comparing said information accepted with that retrieved from said segments;

modifying the execution of said transaction when the results of said comparison indicate that said accepted information relates to that of one of said certain users.

25. The method of claim 24 wherein:

said information accepting step includes the reading of information from a coded card; and said method further comprises the step of revising said cards of said certain users in accordance with information stored in said memory.

26. The method of claim 24 wherein:

said information accepting step includes the reading of information from a coded card; and said method further comprises the step of capturing said card of said certain users.

27. A method for performing banking transactions of a plurality of users comprising the steps of:

reading information from a coded card;

searching a memory in which information read from cards during previous cash transactions are stored;

performing a cash dispensing transaction but only when the information read from said card and that stored in said memory do not compare; and changing the data encoded on said card upon the execution of said transaction.

28. A method for performing banking transactions of a plurality of users comprising the steps of:

reading a card having user identifying information and account information encoded thereon;

searching a memory in accordance with the reading of said card, said memory having stored therein information identifying a plurality of users and in association with said user identifying information additional information relating to some of said plurality of accounts, which additional information indicates that information on cards relating to said accounts is to be revised in accordance with information stored in said memory; and said method further includes the step of revising the information on the card read in accordance with the additional information on said memory, when the user-identifying information read from said card corresponds to information in said memory identifying a user with respect to which the account information associated therewith is to be revised.

29. A method for performing banking transactions of a plurality of users comprising the steps of reading information from a coded card, which information includes:
 a. information relating to the maximum transactional amount permitted during a given usage interval,
 b. information relating to the permitted amount remaining during the current usage interval, and
 c. information relating to the commencement date of said current usage interval;

performing a banking transaction in accordance with a selected amount, which amount is limited by the information read from said card; and revising the information on said card to increase said remaining amount information encoded thereon toward said maximum amount while altering said commencement date encoded on said card.

30. The method of claim 29 wherein:

the information on said card further comprises information relating to the length of said usage interval, and said commencement date represents the next permitted usage date; and said method further includes the step of revising said next permitted usage date on said card to equal at least the original usage date thereon plus said usage interval.

31. The method of claim 30 wherein:

said transaction performing step includes the step of dispensing cash in accordance with said selected amount;

said method further comprises the step of revising said remaining amount information by subtracting therefrom the selected amount of said transaction; and said first-recited revising step is performed when said remaining amount equals zero.

32. The method of claim 30 further comprising the step of:

deriving an effective commencment date equal to the current calendar date and an effective amount remaining equal to said maximum amount when said commencement date read from said card represents a date which is more than the given usage interval before the current calendar date.

33. An automatic banking system for serving a plurality of users each having a card with an account number thereon, a device capable of accounting for transactions involving a plurality of accounts of a given one of said users, means for selecting different transactions involving different ones of said accounts, a card reader for reading said account number from the card of said one of said users, a memory accessible in response to reading said account number containing information relating to the different account transactions permissible to said one user, and means responsive to said information provided by said memory for enabling said selecting means to effect said selected account transactions in accordance with said information.

34. An automatic banking system comprising:

a plurality of user cards encoded with an account number unique to each user and at least one control code correlated to at least one account of said user with respect to which transactions are permissible to said user, said control codes being common to different users;

a device capable of accounting for transactions involving a plurality of different accounts of a given one of said users, said transactions including debiting, crediting and/or transferring funds between different accounts of said one user;

means operable by said one user for selecting different transactions involving different ones of said accounts of said one user;

a card reader for reading said account number and said control code from said card of said one user; and means for enabling said selecting means to effect said selected account transactions in dependence upon the control code read from said card of said one user.

35. An automatic banking system comprising:

a plurality of user cards encoded with an account number unique to each user and at least one control code correlated to at least one account of a plurality of different types of accounts to which a single user may be permitted usage, a device capable of accounting for transactions involving said plurality of different accounts to which a single user may be permitted usage, means operable by said one user for selecting transactions involving different ones of said accounts to which a single user may be permitted usage, a card reader for reading said account number and said control code from said card of said one user, said reading of said control code of said one user reflecting said at least one account of said one user for which usage is permitted, and means for enabling said selecting means to effect said selected account transactions in dependence upon the control code read from said card of said one user.

36. Apparatus for performing banking transactions of a plurality of users comprising:

a plurality of user cards, each encoded with user-identifying information unique to each user and account information correlated to transactions to which said user is permitted, a reader for reading said user identifying information encoded on said cards, a memory having stored therein information identifying a plurality of users and, in association with said user-identifying information, additional information indicating that said account information encoded on the cards of said plurality of users is to be revised in accordance with said additional information stored in said memory; and means for revising the account information on a card which has been read in accordance with said additional information in said memory, when the user identifying information read from said card corresponds to information in said memory identifying a user with respect to which the account information associated therewith is to be revised.

37. The apparatus of claim 36 further comprising:

a device capable of accounting for different types of transactions to which a single user may be permitted usage, means operable by said one user for selecting transactions to which a single user may be permitted usage, and means for enabling said selecting means to effect said selected transactions in dependence on the control code read from said card of said one user.

38. An automatic banking system comprising:

a plurality of user cards encoded with an account number unique to each user and at least one control code correlated to at least one type of fund transfer between different accounts which a single user may be permitted to make, said control codes being common to different users;

a device capable of accounting for transactions involving a plurality of different types of inter-account fund transfers;

means operable by said one user for selecting different types of inter-account fund transfers;

a card reader for reading said account number and said control code from said card of said one user; and means for enabling said selecting means to effect said selected account transaction in dependence upon the control code read from said card of said one user.

39. The system of claim 14 wherein said commencement date information includes data relating to the length of said usage interval and data relating to a specified date included within said current usage interval, and wherein said revising means is operative to alter said specified date by an amount at least equal to said usage interval.

40. The system of claim 39 wherein said revising means alters said specified date when said information related to the permitted amount remaining has reached a predetermined value.

* * * * *

UNITED STATES PATENT OFFICE
CERTIFICATE OF CORRECTION

PATENT NO. : 3,845,277
DATED : October 29, 1974
INVENTOR(S) : Robert H. Voss et al It is certified that error appears in the above-identified patent and that said Letters Patent are hereby corrected as shown below:

Column 7, line 58, "66" should be --65--.

Signed and Sealed this twelfth Day of August 1975

[SEAL]

Attest:

RUTH C. MASON
Attesting Officer

C. MARSHALL DANN
Commissioner of Patents and Trademarks